May 16, 1933. F. WOOD 1,909,031
MEANS FOR LUBRICATING AND COOLING ROLLER BEARINGS
Filed Feb. 24, 1930
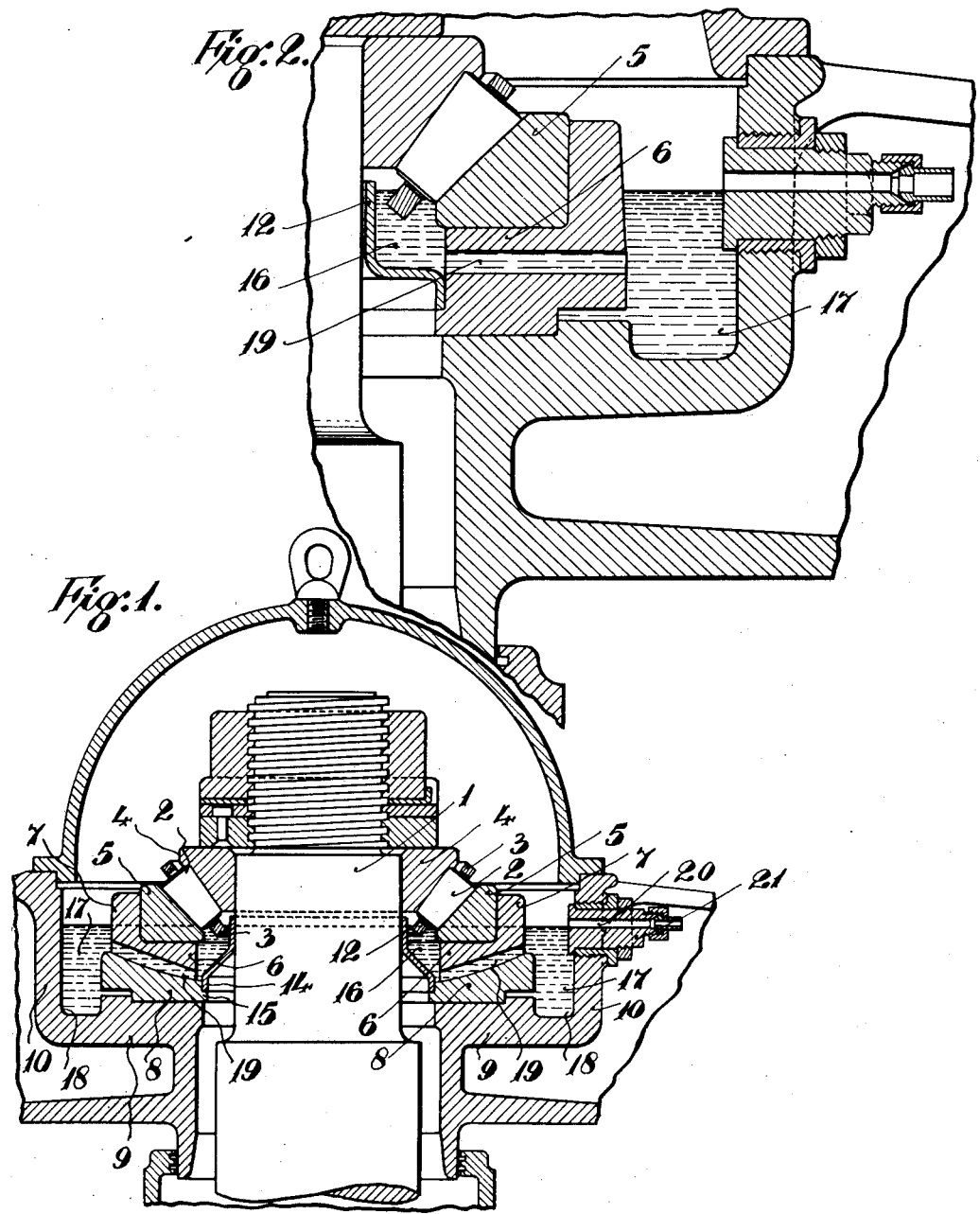
INVENTOR
Frederick Wood
BY
HIS ATTORNEYS Patented May 16, 1933

1,909,031

UNITED STATES PATENT OFFICE

FREDERICK WOOD, OF BIRMINGHAM, ENGLAND, ASSIGNOR TO THE TIMKEN ROLLER BEARING COMPANY, OF CANTON, OHIO, A CORPORATION OF OHIO

MEANS FOR LUBRICATING AND COOLING ROLLER BEARINGS

Application filed February 24, 1930, Serial No. 430,604, and in Great Britain February 28, 1929.

This invention relates to roller bearings, particularly for vertical, or substantially vertical shafts, in which the rollers are of a taper or conical form and are arranged with their smaller ends downwards. The object of the invention is to provide means for lubricating and cooling the bearing and in particular the cage and rollers in an efficient manner.

The invention consists in the combination with the bearing of a receptacle containing lubricant into which a moving part of the bearing, either the rollers or the cage, is arranged to dip, so that the lubricant is caused to pass through the bearing by centrifugal action. The rollers are preferably arranged with their smaller ends presented downwards with the shaft arranged vertically or substantially vertically, so that the centrifugal action causes the lubricant to be conveyed to the upper and larger ends of the rollers, the lubricant then passing back into the lubricant receptacle and thus keeping up a constant circulation. The rollers may be mounted in a cage between inner and outer races in known manner, and an upstanding inwardly-set flange may be attached to the inner periphery of an annular ring or other part supporting or disposed beneath the outer race to form the annular lubricant trough or channel, so that the lower ends of the rollers, or the lower edge of the cage, dip into the lubricant, as stated. Inner and outer channels or troughs are preferably provided, the rollers or cage dipping into the lubricant in the inner channel, and the lubricant, after passing to the upper and larger ends of the rollers, draining into the outer channel from which it may return to the inner channel through suitable communicating passages.

Figure 1 of the accompanying drawing represents a vertical section through the bearing of the vertical armature shaft of a dynamo or electric motor, in which means are provided for lubricating the bearing in accordance with this invention.

Figure 2 is a section through a slightly modified arrangement.

Referring to Figure 1 of the drawing, the vertical armature shaft 1 of the dynamo or electric motor is provided with a roller bearing, the rollers 2, which are of a taper or conical formation, being arranged with their smaller ends presented downwards and being mounted, in known manner, with their axes inclined to the bearing axis, within a cage 3 between inner and outer races 4 and 5 surrounding the shaft 1 so that the rollers may take the end thrust and lateral stresses. The inner upper race 4 is fixed to the shaft 1 so as to rotate therewith, whilst the outer and lower race 5 is carried by an annular supporting ring 6 likewise surrounding the shaft. The lower face of this supporting ring, which has an outer upstanding rim 7 for positioning the race 5, is upwardly-inclined towards its outer periphery and is slightly convex in a transverse direction. This inclined convex lower face of the supporting ring 6 is arranged to rest upon the inclined and slightly concave upper face of a lower ring 8 which, in turn rests upon an annular inwardly-extending part 9 integral with the outer casing 10 of the machine, the arrangement being such as to permit of a slight rocking action or tilting of the shaft 1 to enable the bearing automatically to align itself with the latter. The lower face of the ring 8 and the engaging face of the inwardly-extending part 9 of the machine casing may be stepped or shouldered as shown, so as to position the ring 8. To provide for the lubrication of the rollers 2 an annular sheet metal or other oil-retaining ring 12 is attached to the inner periphery of the lower supporting ring 8, the said oil-retaining ring comprising an inwardly-set vertical flange portion carried by an inclined part which terminates at its lower end in a depending vertical rim portion 14. This depending rim 14 is rigidly fixed to the inner periphery of the lower ring 8, which may be stepped to provide an abutment 15 for the lower edge of the said rim, and the arrangement is such as to provide an annular oil or lubricant channel 16 around the inside of the upper ring 6 immediately below the smaller lower ends of the rollers. The oil-retaining ring 12 extends up slightly above the lower corners of the rollers 2 so that when the channel 16 is filled with oil, the lower corners of the rollers, and the cage 3, dip into the latter. The outer peripheries of the race supporting rings 6 and 8 are separated from and concentric with the wall 10 of the machine casing, thus forming an outer annular lubricant channel or reservoir 17 concentric with the inner channel 16, the bottom of this outer channel being formed by the inwardly-extending part 9 of the casing by which the outer race and the intermediate rings are carried. This bottom portion is preferably formed with an annular recess 18 to provide a trap for any sediment which may be present in the oil. Formed in the lower face of the upper supporting ring 6 which comes between the two lubricant channels, are a number of open-ended transverse or radial passages 19 which serve to place the two lubricant channels 16 and 17 in communication with one another, so that they together form what is virtually a single oil or lubricant reservoir.

The two channels 16 and 17 are filled with oil, up to, or just below, the upper edge of the oil-retaining ring, so that the lower corners of the conical bearing rollers 2 and the lower edge of the cage 3 just dip into the oil, as stated. The arrangement is such that when the machine is in use and the rollers 2 are rotating the centrifugal action due to the said rotation causes the oil to work up to the upper ends of the rollers, owing to the larger ends of the latter being presented uppermost, so that the rollers are completely covered, whilst the excess oil flows over the upper edge of the outer race 5 and drains down into the outer channel 17 between the supporting rings and the machine casing. The oil drawn up from the inner channel 16 by the centrifugal action is replaced immediately by oil from the outer channel 17, the oil for replacement flowing through the radial passages 19 in the upper ring 6, and in this manner a constant circulation of oil past the rollers 2 is kept up while the machine is in use. The rollers are thus adequately and efficiently lubricated the whole time they are rotating, whilst an equally important advantage is that the continuous flow of oil past the rollers also serves to keep the races, rollers and cage cool whilst the bearing is in motion. The efficiency of the bearing is thus increased.

It is undesirable for too much oil to flow past the rollers during a given period, and in order that the flow may be prevented from exceeding certain limits an outlet aperture 20 is provided which determines the level of the oil in the channels 16 and 17 when the latter are being filled, so that it is thus impossible for the rollers to dip too deeply into the oil. It is thus only necessary occasionally to fill the channels up to this aperture for the efficient lubrication and cooling of the bearing. To enable the maximum level of the oil to be varied within certain limits the overflow aperture 20 is preferably formed, as shown, by an eccentrically-disposed hole in a bush 21 rotatably mounted within the wall 10 of the machine casing. Thus, by turning this bush the height of the overflow, and consequently the level of the oil, may be readily regulated. If desired, the same purpose may be served by the provision of a cranked overflow pipe, rotatably mounted so that by turning the pipe the height of its outer end may be varied. The maximum level of the lubricant may thus be controlled so that lubricant is prevented from escaping and working its way down the shaft, which in the case of an electric machine is an important advantage.

It is not absolutely necessary for the lower ends of the rollers to dip into the oil, since an efficient lubrication of the bearing may be effected if the lower edge of the cage only dips into the oil, provided the cage rotates at a sufficient speed. Owing to the conical shape and disposition of the cage the oil will be drawn, owing to the centrifugal action, towards the upper and larger end of the same, so that the rollers will thus become covered with the oil, the rollers themselves then assisting in drawing up the oil which on reaching the larger ends of the rollers drips down into the outer channel.

If desired, the oil retaining ring or flange may be carried by the upper race supporting ring 6 instead of being carried by the lower ring 8, as described. Further, the arrangement for the self-alignment of the bearing may be dispensed with.

The arrangement illustrated in Figure 2 of the drawing is substantially the same as that previously described, and the main difference lies in the provision of a single supporting ring 6 for the outer race 5 of the bearing, the lower ring being dispensed with. The oil retaining ring or flange 12, is, in this case, carried by the ring 6, while the latter is drilled with a series of radial oil passages, such as 19, which place the two concentric oil troughs 16 and 17 in communication with one another.

Any other suitable arrangement may be employed having an oil channel or reservoir for the rollers and cage, or for the cage only, to dip into, provided the oil is returned to the reservoir as it flows or drips from the upper ends of the rollers, so as to keep up a constant circulation of oil through the bearing when the machine is in use. Although not absolutely necessary a suitable sealing device may be inserted between the Having fully described my invention, what I desire to claim and secure by Letters Patent is:—

1. The combination with a taper roller bearing on an upstanding shaft of a lubricant receptacle surrounding the shaft and adapted and arranged to maintain the lubricant level just above the lower end of a moving component part of the bearing, means for supporting the bearing with the smaller ends of the rollers presented downwards and with the lower end of a component moving part of the bearing continuously dipping into the lubricant, whereby the lubricant is caused to pass to the upper ends of the rollers by centrifugal action, and means for permitting the lubricant to return from the upper ends of the rollers to the lubricant receptacle.

2. The combination with a taper roller bearing on an upstanding shaft of an inner lubricant channel surrounding the shaft and arranged to hold lubricant at a level just above the lower ends of the rollers, an outer lubricant channel, means for supporting the rollers with their smaller ends downwards so that they all dip continuously into the lubricant in the inner channel, and cause the lubricant, by their rotation, to be conveyed to the upper ends of the rollers into the outer channel, and a passage between the inner and outer channels for conveying the lubricant from the outer channel back into the inner channel.

3. The combination with a taper roller bearing on an upstanding shaft of an inner lubricant channel surrounding the shaft, an outer lubricant channel, means for supporting the rollers with their smaller ends downwards, a cage for the rollers with its lower edge dipping into the lubricant in the inner channel and conveying, by its rotation, the lubricant to the upper ends of the rollers and thence into the outer channel, and a passage between the inner and outer channels for conveying the lubricant from the outer channel back into the inner channel.

4. A taper roller bearing comprising an inner race on an upstanding shaft and an outer race supporting the rollers, in combination with an annular support for the outer race, an upstanding part at the inner edge of the outer race support forming with the latter an inner annular lubricant channel surrounding the shaft, the said channel being disposed so that a moving part of the bearing dips into the lubricant, an outer lubricant channel for receiving lubricant from the upper ends of the rollers and a passage between the inner and outer lubricant channels below the level of the lubricant.

5. The combination with a taper roller bearing on an upstanding shaft of an inner lubricant channel surrounding the shaft, means for supporting the rollers with their smaller ends downwards with a moving part of the bearing dipping into the lubricant in the inner channel, an outer lubricant channel for receiving lubricant from the upper ends of the rollers, a passage between the inner and outer channels below the level of the lubricant and a part in the wall of the outer channel having an overflow passage, the said part being rotatable to vary the height of the overflow passage.

6. A taper roller bearing comprising an inner race on an upstanding shaft and an outer race supporting the rollers, in combination with a lubricant chamber and a part supporting the outer race dividing the lubricant chamber into inner and outer compartments communicating with one another by passages below the level of the lubricant, the inner compartment being disposed so that a moving part of the bearing dips into the lubricant therein, conveying it to the upper ends of the rollers from which it passes into the outer compartment.

7. The combination with a taper roller bearing on an upstanding shaft of an inner lubricant chamber surrounding the shaft, means for supporting the rollers with their smaller ends downwards with a moving part of the bearing dipping into the lubricant in said inner chamber, an outer lubricant chamber for receiving lubricant from the upper ends of the rollers and a passage between the inner and outer chambers below the level of the lubricant, the said outer chamber having an overflow passage.

8. The combination with an upstanding shaft, of a taper roller bearing comprising an inner race on the shaft, an outer race and taper rollers between said races; a part supporting the outer race; a lubricant chamber around the shaft said chamber being disposed so that a moving part of the bearing can dip into the lubricant in the chamber and having an inner upstanding wall extending above the lower end of said moving part of the bearing; and means whereby lubricant which is conveyed to the upper ends of the rollers is allowed to return to the lubricant chamber.

9. The combination with an upstanding shaft, of a taper roller bearing comprising an inner race on the shaft, an outer race and taper rollers between said races; an inner lubricant chamber surrounding the shaft; means for supporting the rollers with their smaller ends downward with a moving part of the bearing dipping into the lubricant in the inner chamber; an outer lubricant chamber for receiving lubricant from the upper ends of the rollers; a passage provided between the inner and outer chambers and an overflow outlet from the outer chamber for determining the level of the lubricant in the inner chamber; the inner bearing race having its lower end situated above the overflow outlet and the inner chamber having an upstanding inner wall extending to a height above said overflow outlet.

10. The combination with an upstanding shaft, of a lubricant chamber surrounding the shaft; a taper roller bearing comprising an inner and upper race on the shaft, an outer lower race and taper roller bearings disposed between said races with their smaller ends downward so that said smaller ends can dip into the lubricant in the chamber, the inner race having its lower end situated above the lower ends of the said rollers; a part supporting the outer race; and means for enabling lubricant which has been conveyed to the upper ends of the rollers to be returned to the lubricant chamber, the said lubricant chamber having an inner upstanding wall extending to a level above the lower ends of the rollers.

In testimony whereof I have affixed my signature.

FREDERICK WOOD.